United States Patent [19]

Bonanno

[11] Patent Number: 4,662,990
[45] Date of Patent: May 5, 1987

[54] APPARATUS FOR RECOVERING DRY SOLIDS FROM AQUEOUS SOLIDS MIXTURES

[75] Inventor: Anthony J. Bonanno, Parsippany, N.J.

[73] Assignee: Hanover Research Corporation, East Hanover, N.J.

[21] Appl. No.: 790,611

[22] Filed: Oct. 23, 1985

Related U.S. Application Data

[62] Division of Ser. No. 683,719, Dec. 19, 1984.

[51] Int. Cl.$^4$ .............................................. B01D 1/26
[52] U.S. Cl. .................................. 159/20.1; 159/901;
159/905; 159/DIG. 25; 34/9; 62/541; 202/174;
202/176; 203/47; 203/48; 203/DIG. 25;
210/195.1; 210/202; 494/43
[58] Field of Search .................... 159/17.1, 20.1, 47.1,
159/905, 47.3, 901, DIG. 3, DIG. 5, DIG. 10,
DIG. 33, DIG. 23, DIG. 25; 202/176, 174,
185.1; 203/47, 48, 25, DIG. 25, 100; 62/541,
532, 542; 34/9; 210/195.1, 202, 511; 494/43

[56] References Cited

U.S. PATENT DOCUMENTS

| | | | |
|---|---|---|---|
| 2,511,711 | 6/1950 | Hetzner et al. | 203/48 |
| 2,541,682 | 2/1951 | Arnold | 203/48 |
| 2,810,772 | 10/1957 | Bennett et al. | 203/48 |
| 2,815,288 | 12/1957 | McKay | 62/542 |
| 2,929,150 | 3/1960 | Johnston | 34/9 |
| 3,333,929 | 8/1967 | Mazurek et al. | 159/DIG. 25 |
| 3,477,829 | 11/1969 | Dockendorff et al. | 203/48 |
| 3,531,295 | 9/1970 | Ganiaris | 62/542 |
| 3,734,160 | 5/1973 | Osdor | 203/100 |
| 3,950,230 | 4/1976 | Greenfield et al. | 203/47 |
| 4,008,255 | 2/1977 | Wirth et al. | 203/48 |

OTHER PUBLICATIONS

Perry, J. H. et al; *Chemical Engineers' Handbook*, 4th Edition, pp. 19-86, 87, 19-93-97, (1963).

*Primary Examiner*—Wilbur Bascomb
*Attorney, Agent, or Firm*—Richard L. Cannaday; John F. Smith; William J. Ungvarsky

[57] ABSTRACT

A continuous process and apparatus for drying aqueous solids by evaporation using a fluidizing oil and a surfactant wherein the fluidizing oil and surfactant are recovered and recycled separately or together. The aqueous solids may, or may not, have a heavy, natural oil associated with them.

2 Claims, 6 Drawing Figures

LIGHT OIL
NO NATURAL OIL IN FEED

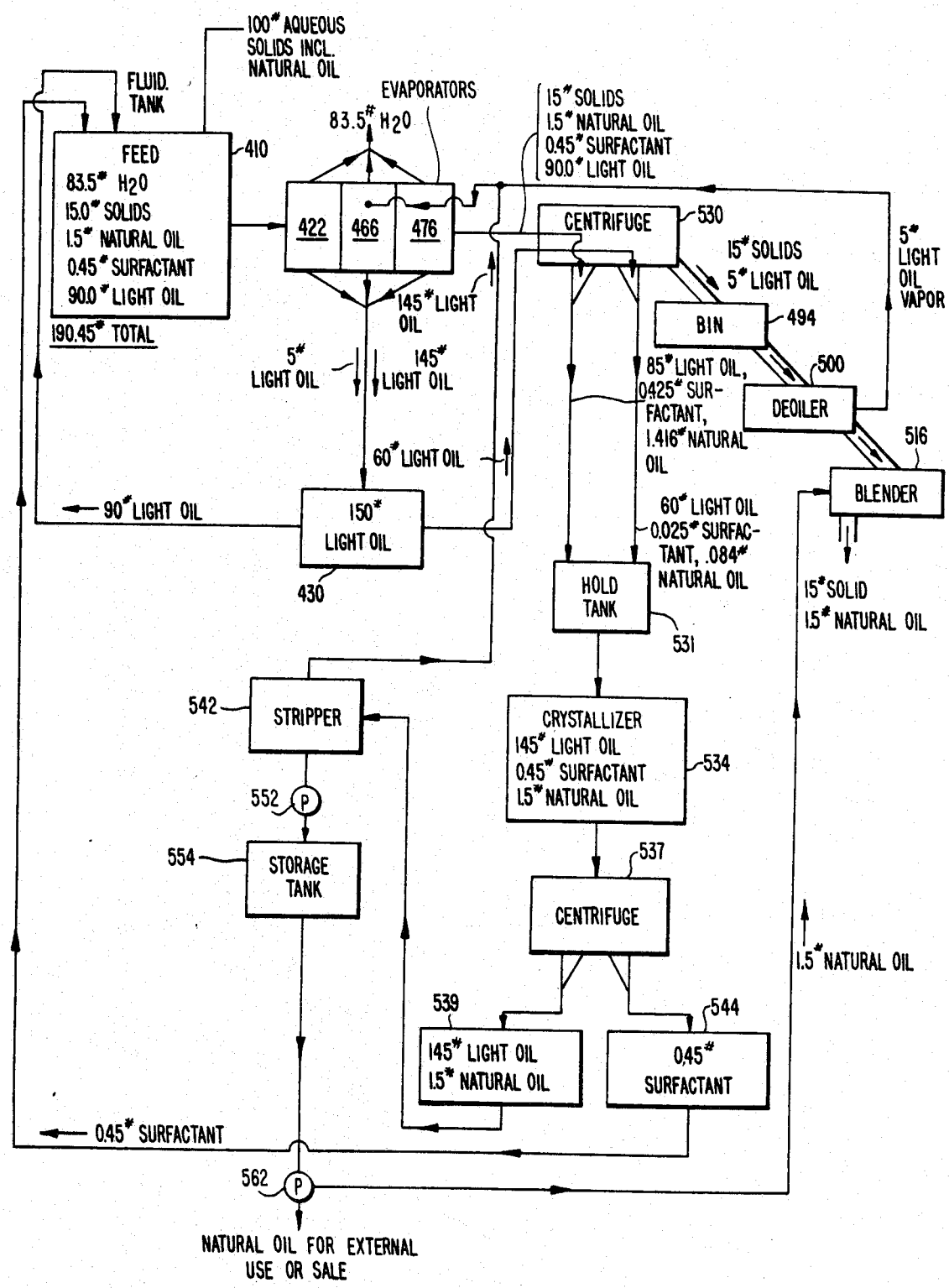

APPARATUS FOR RECOVERING DRY SOLIDS FROM AQUEOUS SOLIDS MIXTURES

This is a division of application Ser. No. 683,719, filed Dec. 19, 1984.

BACKGROUND OF THE INVENTION

1. Field of the Invention

This invention relates to a process for dehydrating solids in aqueous solids mixtures and recovering said solids for further use. Specifically, it deals with a continuous process for drying aqueous solids using a fluidizing oil and a surfactant in an evaporation process wherein the fluidizing oil and surfactant are recovered and recycled.

2. Discussion of the Prior Art

The recovery of dry solids from aqueous solids mixtures is the object of a large industry. Those solids, whether they be waste solids or valuable solids such as chemical solids for consumption by industries or feed for consumption by humans or animals, present many processing problems, both ecologically and relative to efficiency of production. There have been known many processes for economically producing dry solids and, at the same time, extracting the aqueous phase in a form acceptable for disposal or reuse. In order to facilitate those processes, some methods have used various fluidizing oils so that the slurries formed can be dried at high temperatures and still remain pumpable. Although those processes efficiently produce dry solids and solve the ecological problem, there are still some difficulties associated therewith.

In processes for drying solids by evaporation using fluidizing oils, the solids sometimes tend to form large masses that adhere to the inner walls of the pipeline, vapor chamber and heat exchanger tubes while the oil phase may be circulating with little or no wet solids. There are also instances where circulation is prevented due to the solids settling out and plugging the pipeline or circulating pump. Those wet solids, when not properly dispersed and suspended, may coat the heat exchanger surfaces and then dry as a scale reducing the heat transfer rate in the heat exchanger so that the evaporation rate is reduced markedly and the efficiency of the evaporation is very low. Further, when those wet solids adhere to the walls of the evaporators, pipelines, or holding tanks, they can cause corrosion of those apparatus elements if the solids be of an acidic nature.

There are also cases where a mixture of wet solids and oil in the fluidizing tank or feed tank are not pumped uniformly to the evaporator due to the settling of the solids and the immiscibility of the two phases. That action tends to result in a disproportional amount of either wet solids or oil in the mixture sent to the evaporator and tends to upset the system.

It is apparent, therefore, that there exists a need for a more efficient system for continuously dehydrating solids from aqueous mixtures without the aforementioned problems.

SUMMARY AND OBJECTS OF THE PRESENT INVENTION

The process and apparatus of this invention comprise a series of steps and a systematic arrangement of equipment for continuously recovering dry solids from aqueous solids. The process comprehends the use of surface active agents as an aid to causing a suspension of condition of miscibility, in a multiple phase system of oil, water and solids for the efficient concentration and drying of products such as food, food wastes, chemicals, pharmaceutical wastes and sewage in a fluidizing oil.

It has been found that the addition of a surfactant to the fluidizing oil in a dehydration process for drying solids in aqueous solid suspensions will eliminate many of the disadvantages of past processes allowing the suspensions to move continuously through the process in a more efficient manner using less heat and causing less detriment to the equipment used. The process comprises the following steps:

(1) Mixing aqueous solids with a fluidizing oil and a surfactant to obtain a mixture which is and remains fluid and pumpable before, during, and after removal of the water content therefrom;

(2) Subjecting the resulting oil, surfactant containing, mixture of solids and water to dehydration by heat evaporation whereby substantially all of the water is removed by vaporization from the mixture of slurry;

(3) Condensing and removing the water vapor;

(4) Separating the bulk of the fluidizing oil and at least some of the surfactant from the solids;

(5) Recycling the surfactant and the fluidizing oil back to the system, i.e., to the entry point of the aqueous solids feed;

(6) Recovering the solids for use; and (7) Recovering any natural oil, i.e., oil associated originally with the solids, for use or sale.

In the above process the surfactant may be separated from the fluidizing oil prior to recycle depending on which oil is used.

By the use of a surfactant in the above dehydration process the following advantages may be achieved: an increased evaporation rate, a product of more uniform particle size, a reduction of viscosity with increase in pumping rate, a reduction of corrosion of metal parts in the equipment, depression of foam in the suspension, and reduction of boiling point rise. Those advantages result from the surfactant providing a more homogenous slurry of the particles in the fluidizing oil allowing for the continuous process to operate without interruption because of clogging or deposits throughout the equipment.

It is, therefore, an object of the invention to provide a continuous process for the dehydration of aqueous solids in a fluidizing oil medium containing a surfactant.

It is another object of the present invention to provide a continuous process for dehydrating aqueous solids in a fluidizing oil medium containing a surfactant wherein both the fluidizing oil and the surfactant are recovered and recycled.

It is still another object of this invention to provide a continuous process for dehydrating aqueous solids in a fluidizing oil containing a surfactant wherein the fluidizing oil is a light volatile oil.

Yet another object of this invention is to provide a continuous process for dehydrating aqueous solids in a fluidizing oil containing a surfactant wherein the fluidizing oil is a relatively heavy, non-volatile-type oil, sometimes referred to herein as heavy oil.

These and other objects and advantages of the present invention, including those represented by and deriving from its apparatus aspects, will be apparent from the following detailed description and the accompanying drawings.

BRIEF DESCRIPTION OF THE DRAWINGS

FIGS. 4, 5, and 6 are schematics derived from FIGS. 1, 2, and 3, respectively, of specific examples showing amounts of material being treated and components of treatment, consistent with a steady flow condition oil-solids-surfactant material balance in each instance.

DESCRIPTION OF THE PREFERRED EMBODIMENTS

Figure 1:
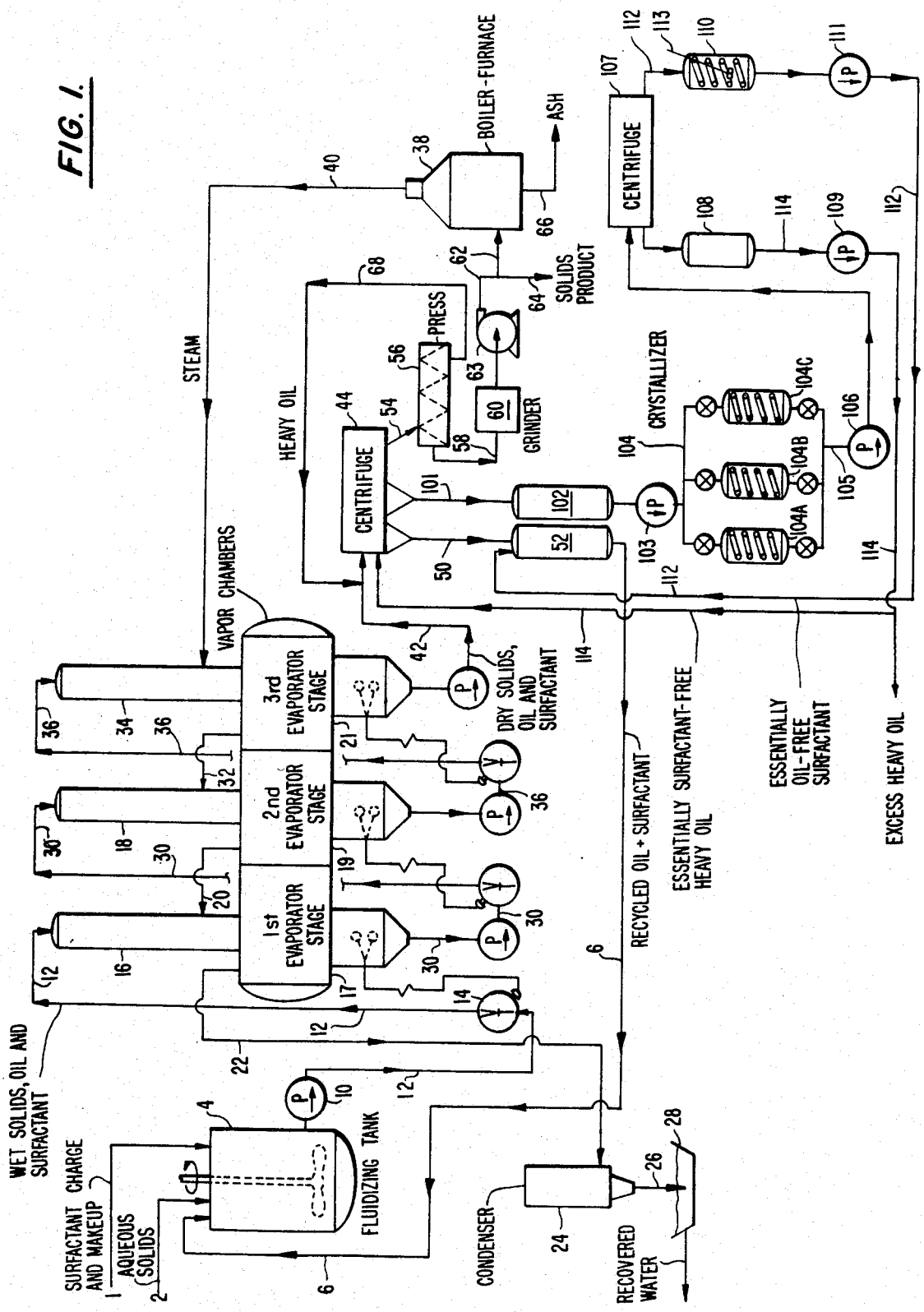
FIG. 1 is a flow diagram representing an apparatus of one embodiment of the invention wherein a heavy oil is used as a fluidizing oil, showing the separation, crystallization, and recycling of the surfactant.

The dehydration process of this invention involves three concepts which have been not combined previously for aqueous solids evaporation-dehydration. They are (1) use of a surfactant along with the fluidizing oil; (2) maintenance of the process as a continuous process, and (3) recovery of the surfactant and the fluidizing oil either separately or together and their recycling either separately or together back into the process for reuse.

The process comprises mixing aqueous solids feed material, a fluidizing oil and a surfactant in a vessel designated a fluidizing tank to obtain a mixture which will remain fluid and pumpable after removal of essentially its entire water content, and thereafter subjecting the resultant mixture of solids, water, surfactant and oil to a dehydration step or steps by heat evaporation whereby substantially all of the water is evaporated and subsequently recovered. Following dehydration, the fluidizing oil is separated from the solids.

In the case where the fluidizing oil is a light oil, that is, a low viscosity, relatively volatile oil, and the solids to be treated contain or are accompanied by a natural oil themselves, that oil being for the most part a relatively heavy, non-volatile oil, the solids are washed in a centrifuge with recycled light oil. All of the oil carrying at least some surfactant is removed to a separating device, e.g., a crystallizer, where the surfactant may be crystallized out and separated by centrifugation, filtration or other suitable technique. The crystallized surfactant may be recycled to the fluidizing tank while the light oil containing natural oil is charged to a stripper for the recovery of the natural oil which is then discharged for external use or sale or blended with the solids from a deoiler.

Where the material to be dried contains no natural oil, the solids are washed with light oil condensate from the evaporator and the light oil from that step is recycled along with the surfactant therein to the fluidizing tank.

When the drying oil is a heavy oil, that is, a triglyceride or non-volatile-type oil, the solids after evaporation are centrifuged to separate the oil therefrom. The oil is divided into two segments, one of which is directly recycled to the fluidizing tank while the other is directed to a crystallizer for crystallizing out the surfactant which is subsequently separated from the oil by centrifugation or filtration. The surfactant is then recycled to the fluidizing tank through a centrifuge oil holding tank and the oil is charged to the centrifuge for washing the surfactant frree from the centrifuged solids.

As set forth above, the fluidizing oil can be either a light oil or a heavy oil. By light oil is meant oil having a boiling oil in the range of about 250°–600° F. which was fractionated, distilled or compounded from petroleum oil.

The heavy oils can be triglyceride oils or petroleum oils. The triglyceride oils can be oils which are extracted from animal origins such as beef fat, pork fat, chicken fat, fish oil, etc. They can also be oils which are extracted from vegetable origins such as soybean oil, cottonseed oil, peanut oil, coconut oil, etc. By petroleum oil is meant oil having essentially no fraction volatile under the conditions of temperature and pressure of the dehydration process of this invention.

The materials to be treated by the process of this invention should contain solid particles generally no larger than about $\frac{1}{4}$ inch. However, larger particles are acceptable provided that the clearance past the heat transfer surfaces be increased. Large particles may be ground to size or comminuted by existing techniques. The evaporative drying of a wetted material is most efficient when the particles are small, uniform in size and evenly dispersed in the circulating fluidizing oil medium. In the ideal mixture, the particles are reformed and become suspendible again after the mixture is allowed to stand for a period of time without agitation by merely agitating again.

When used with granular material such as corn or grain, the surfactant will prevent coagulation of the granules. When used with a mass of material such as sludge, the surfactant tends to produce a uniform particle size while in the wet state in oil. This uniformity of size is maintained throughout the entire operation to ultimately produce a finished product of uniform size.

Varying the amount of the surfactant will result in smaller or larger particle sizes and, therefore, may be utilized as a tool in predetermining the particle size and consequently the oil content of the finished dry particle.

Many of these surfactants are of food grade quality and may be used when the finished product is intended for human consumption or animal feed. The small amount of surfactant that is left on the dry product solids will tend to improve their reconstitutability when added to water, with other ingredients, to make a food ration. The surfactant may act also as an emulsifier for the water-oil-solids mixture to produce a more homogeneous preparation. Further, it may increase the water binding properties of food products such as bread, cakes, purees, etc.

Specific characteristics of surfactants used for the dispersion of water wet solids in an oil are:

(1) Solubility in the oil phase;

(2) Hydrophilic-Lipophilic Balance number of 8–17, preferably 9–11;

(3) Resistance to decomposition at the process operating conditions of temperature and pressure;

(4) Federal Food and Drug Administration acceptance when the solids dried in a process such as the Carver-Greenfield Process (see U.S. Pat. Nos. RE. 26,317, 3,950,230, and 4,270,974, for examples) are intended for human or animal ingestion; and (5) Negligible volatility at the process operating conditions of temperature and pressure.

Preferably the surfactants are used in amounts of from about 0.05 to 10.0% by weight of the fluidizing oil and are usually non-ionic. They may be part of the class of compounds such as monoglycerides and diglycerides sold under the tradenames ARLACEL by ICI of the United States, Inc., DUR-EM by Durkee Industrial Foods of Ohio, and EMEREST by Emery Industries, Inc. of South Carolina; polyoxyethylene sorbitan fatty acid esters sold under the tradename TWEEN by ICI of the United States, Inc., DURFAX by Durkee Industrial Foods of Ohio, and EMSORB by Emery Industries, Inc. of South Carolina; polyoxyethylene sorbitol esters sold under the tradename ATLOX by ICI of the United States, Inc; polyglycerol esters of fatty acids sold under the tradename SANTONE by Durkee Industrial Foods of Ohio; polyoxyethylene triglycerides of the 400 series sold by ICI of the United States, Inc.; sorbitan fatty acid esters sold under the tradename SPANS by ICI of the United States, Inc. and EMSORB by Emery Industries, Inc.; sulfonated oils by Sulpho Corporation of New Jersey; and lecithin by Central Soya Inc. of Illinois.

The HLB (Hydrophilic-Lipophilic Balance) number may be chosen for any one of the compounds listed above, or may be obtained by the mixing of two or more of those compounds to give the desired HLB number.

A dispersion of water wet particles in hydrocarbon-type oil is more difficult to obtain than a dispersion of the same particles in a triglyceride-type oil. That is due to a number of reasons. One is that certain hydrocarbon-type oils are somewhat hydrophobic, i.e., lacking in water soluble components, due to their chemical make-up and, therefore, lack the hydrophilicity necessary to disperse wetted particles effectively. In contrast, the chemical make-up of triglycerides includes hydrophilic components which assist in forming water-oil dispersions. Another reason is the difference in specific gravity between the oil and the wetted solids phase. Hydrocarbon oils usually have a specific gravity of about 0.75, while that of triglyceride oils is about 0.93. The water wet particles have a specific gravity of 1.0 or slightly greater and, while not buoyant in either kind of oil, will stay suspended longer in a triglyceride oil than in a hydrocarbon oil.

The word "dispersion" or "suspension" has been used throughout this description instead of the word "emulsion". Surface active agents are also used to make emulsions where the mixture in many cases becomes very thick and viscous. That condition is not desired in the present process. A condition in which the surface active agent causes particles to be easily suspendible without causing an increase in viscosity of the mixture is desired.

The increase in pumping rate associated with the disclosed use of surfactants is evident from the following example:

EXAMPLE I

Corn stillage was mixed with corn oil to be dried. When charged to the evaporator and placed under vacuum and heat, the pumping rate was 3.0 gpm. After the addition of a surfactant, the pumping rate rose to 24.3 gpm. In this example, polyglycerols of oleic acid in an amount of 0.45% by weight of the fluidizing oil were used as the surfactant.

A suspension of oil and water wet solids when properly made with the use of surface active agents, as mentioned above, permits the oil phase to make contact with the metal surfaces of the heat exchanger, vapor chamber and piping. In that manner, there is no corrosion of those metal parts when dehydrating an acidic material in an oil medium.

Foam depression has been seen to occur when surface active agents are used in the drying of water wet solids in an oil medium. Due to the surfactant, the vapor is releasd more rapidly in larger bubbles and does not tend to accumulate to form a foam layer which can upset an evaporator system. Persistent foams are usually composed of a multitude of small bubble that do not collapse easily so that the vapor contained within can be released.

The small bubble size is usually caused by the slow release of small quantities of water vapor. Those small bubbles have a high surface tension and do not collapse easily and, therefore, tend to accumulate to form a persistent foam layer. The use of a surfactant reduces the surface tension of each bubble causing it to collapse, thereby retarding the formation of any further foam.

Referring now to the drawings in detail, aqueous feed enters the apparatus of FIG. 1 through input 2 at the left, and is fed to fluidizing tank 4 for mixing with relatively heavy, non-volatile fluidizing oil and recycled surfactant applied through line 6. Make up surfactant is added through line 1 as needed to replace that small quantity lost from the system largely on the dry solids product. Pump 10 moves the resulting mixture of oil, surfactant and aqueous feed from tank 4 through connecting line or conduit 12 and throttle valve 14 to the tube bundle or evaporating region of first stage 16 of a three-stage or triple effect evaporator. Each stage of the evaporator removes about one-third of the water from the aqueous feed mixture supplied at 16. At start-up, sufficient fluidizing oil containing recycled surfactant is added through line 6 to insure that, after evaporation of its water content, the system or mixture of feed and oil and/or fluid fats remains pumpable.

In first evaporator stage 16 about ⅓ of the water is boiled off at a reduced pressure of approximately 2 inches Hg absolute, and the temperature of the partially dehydrated product in the sump or bottom of that stage is maintained at approximately 110° F. Heating vapor enters first evaporator stage 16 from second stage vapor chamber 19 through connecting line 20 at a temperature in the neighborhood of 145° F. Vapor is removed from first evaporator stage vapor chamber 17 via connecting line 22 which passes it into a condenser 24. There, cooling water condenses the vapor and the recovered water or condensate is discharged through line 26 to hot well 28. A slurry of partially dehydrated feed in fluidizing oil and surfactant is removed continuously from the bottom of first evaporator stage 16 through line 30 and fed to the evaporating region of second evaporator stage 18.

In second evaporator stage 18 a procedure is followed similar to that in the first stage, except that the sump or product temperature is maintained in the neighborhood of 150° F. by vapor coming at approximately 190° F. From vapor chamber 21 of the following stage through connecting line or conduit 32. About one-half of the water remaining in the fluidized feed is removed in the second stage. A further partially dehydrated feed, surfactant and oil slurry is withdrawn from the bottom of second evaporator stage 18 via connecting line 36, and charged to the evaporating region of the third evaporator stage 34 in the manner used for slurry transfer between the first and second stages.

In the third stage the product temperature is about 250° F., maintained by steam supplied at about 300° F.

by boiler-furnace 38 and transmitted through line 40. The substantially dehydrated slurry withdrawn from the bottom of third evaporator stage 34 through line 42 contains approximately 0.075 to 0.45% water based on the entire slurry, the remainder being oil containing surfactant. That slurry is in a substantially anhydrous or dry condition.

Level control in the several stages of the evaporator equipment is maintained by a level sensing element in the slurry sump or bottom of each stage which transmits signals to a throttle valve following the pump which supplies that stage. As shown, level sensing elements in the slurry sumps of first, second and third evaporator stages 16, 18 and 34 control pump discharge throttle valves in slurry feedlines 12, 30, and 36, respectively. The evaporator level control system illustrated and described is of a conventional nature.

The substantially dehydrated surfactant, oil and solids mixture maintained at an appropriate level in the sump of third evaporator stage 34 is withdrawn continuously therefrom through line 42 to centrifuge 44 having a screen bowl section, but prior to entering the centrifuge it is joined by a stream of heavy oil from filter press or expeller 56 recirculated through line 68. Within centrifuge 44 the initial effect of simple centrifugation throws off the bulk of the surfactant and heavy oil from the solids. The thrown off material flows from the centrifuge through line 50 to centrifuge oil tank 52 for recycling through oil and surfactant supply line 6 to fluidizing tank 4. Continuing through the centrifuge, the solids input thereto enters the screen bowl section thereof and is there washed by heavy oil returned from centrifuge 107 through line 114. That washing removes the residual surfactant from the solids, and a heavy oil flows from centrifuge 44 through line 101 to holding tank 102.

Pump 103 withdraws mixed heavy oil and surfactant from tank 102, and delivers that material to an array of crystallizers generally designated 104 comprising individually valved tanks 104A, 104B and 104C arranged in parallel and provided individually with indirect cooling means. Within the overall crystallizer arrangement the surfactant content of the incoming mixture of heavy oil and surfactant is crystallized out substantially continuously in what is a coordinated set of batch operations in the three tanks of the crystallizer apparatus.

Exemplifying the crystallization operation suppose that the outlet valve of tank 104A is closed but the inlet valve of that tank is open and a heavy oil and surfactant mixture is flowing into the tank from tank 102. That step or operation is called the fill or charge step. Tank 104B has been filled previously and its inlet and outlet valves are each closed and its cooling means activated. Thus, while tank 104A is filling tank, 104B is quiescent and cooling to crystallize the surfactant component of its content fluid. That step or operation is called the hold step. Meanwhile tank 104C having been charged prior to tank 104B and held at the proper cooling temperature for the time required to effect crystallization has had its outlet valve opened and its heavy oil and crystallized surfactant content is flowing out therethrough. This is called the discharge step. Tank 104B would be the next to discharge while tank 104A holds and tank 104C fills; then tank 104A would discharge while tank 104C holds and tank 104B fills; then tank 104C would discharge while tank 104B holds and tank 104A fills, and so on repetitively.

As a result of the operation just described a steady stream of heavy oil with a crystalline surfactant content flows away from crystallizer 104 through line 105 including pump 106, and is delivered to centrjfuge 107 within and by which the crystallized surfactant is separated from the heavy oil. The heavy oil, essentially free of surfactant, leaves centrifuge 107 through line 114 and flows to holding tank 108 from which it is withdrawn by pump 109 in line 114 and recycled to centrifuge 44 for a washing purpose described already. If there be an excess of process oil so far as fluidizing needs are concerned, possibly because the aqueous feed material entering the system through line 2 has heavy oil associated with it, oil may become available as a net product of the process and be tapped off from line 114 as shown.

The crystallized surfactant output from centrifuge 107 leaves through line 112 and flows to remelt tank 110 equipped with heating means and an agitator 113 to accelerate the melting process. From tank 110 the essentially oil-free surfactant continues to flow through line 112, and by pump 111 therein is delivered to centrifuge oil tank 52 for mixing with heavy oil therein. From tank 52 the surfactant is recycled along with the oil through line 6 to fluidizing tank 4.

Essentially anhydrous solids flowing through centrifuge 44 after being washed with heavy oil to remove residual surfactant from them, as described already, leave the centrifuge through line 54. The material stream in that line may have about 25% heavy oil content by weight, and it enters filter press or expeller 56 in and by which its oil content is reduced. The resulting substantially deoiled as well as anhydrous solids, now in the condition of a product, are delivered from press 56 via line or conveyor 58 to grinder 60 and then blown through line 62 by blower 63 to boiler-furnace 38 for burning as fuel in the furnace or combustion region thereof. Should some or possibly all of the solids be desired for use outside the system, use as fertilizer for example, they may be diverted from line 62 through line 64 for an external takeoff.

Steam generated in the boiler-furnace is delivered therefrom through line 40 to the third evaporator stage 34 as the heating medium for that stage. Although not illustrated specifically in FIG. 1, condensate of that steam heating medium may be returned as feed water to the boiler region or water side of the boiler-furnace. Also although not illustrated specifically in FIG. 1, condensate of the heating media of second evaporator stage 18 and first evaporator stage 16 may be recovered along with condensate of vapors leaving the vapor chamber of the first evaporator stage, the recovery of which is illustrated in FIG. 1. Those recovered materials will all be water for the greater part, but at least trace amounts of oil may be present in them. Thus whether treated together or individually they should be subjected to an oil separation or removal operation if water properly designated clean water should be desired.

Ash resulting from the burning of product solids or any solid fuel in the furnace region of boiler-furnace 38 is removed therefrom through line 66. Oil resulting from the pressing of solids in filter press or expeller 56 is recycled to centrifuge 44 through line 68, mixing with the anhydrous oil-solids slurry fed to that centrifuge through line 42. As the solids leave press 56 through line 58 they will still have some heavy oil in the nature of fluidizing oil associated with them, along with possible trace amounts of surfactant. That oil and surfactant will be lost from the system whether the product solids be burned as fuel in boiler-furnace 38 or withdrawn through line 64 for external use. Replacement fluidizing oil may be supplied at fluidizing tank 4 in the event that the system does not generate an excess or at least a break even amount of oil through use of an oil-rich feed material, a possibility considered hereinbefore. Replacement surfactant is furnished through line 1.

Figure 2:
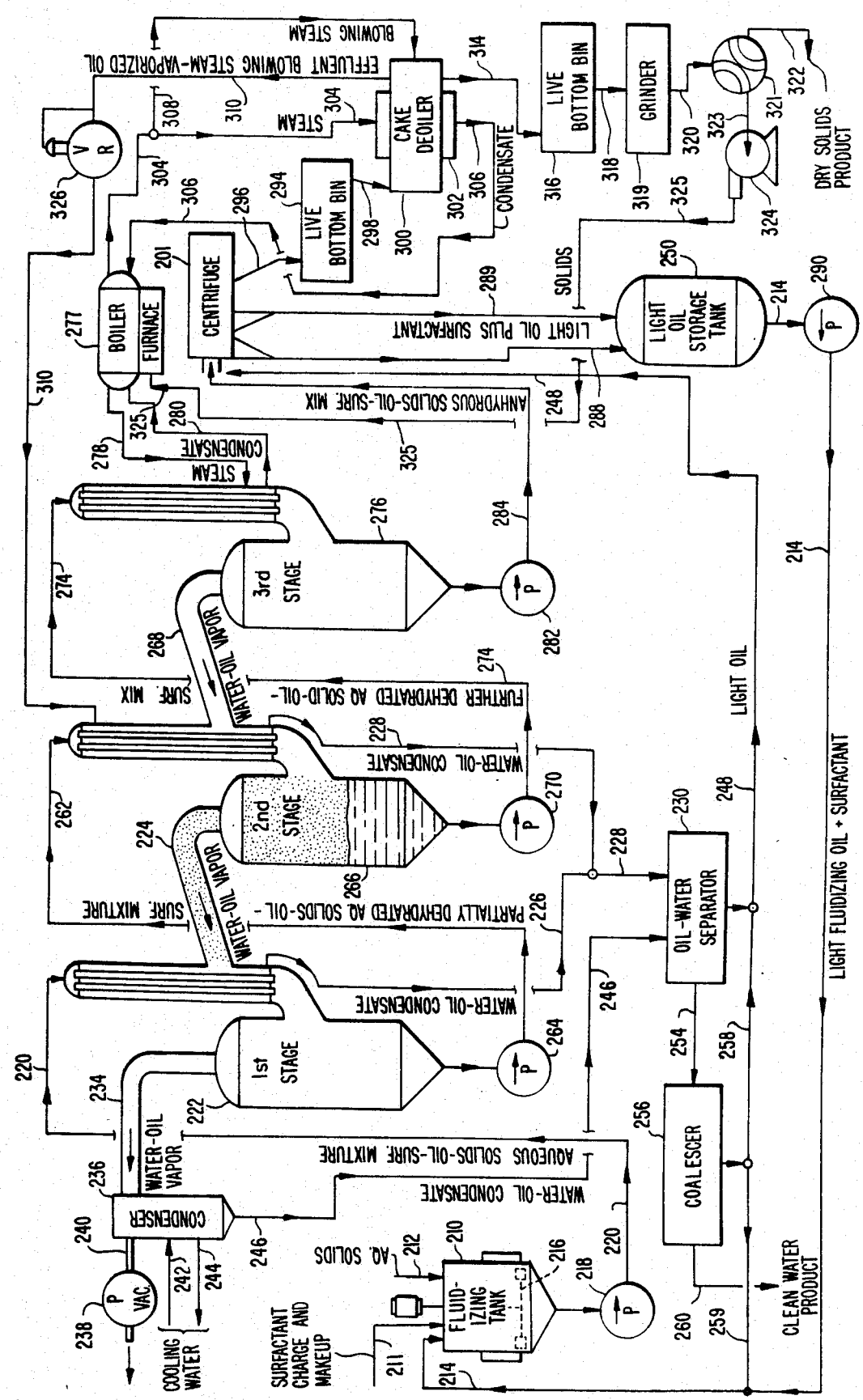
FIG. 2 is a flow diagram which illustrates an apparatus of another embodiment of the invention wherein light oil is used as a fluidizing oil and the feed does not contain a natural oil.

Referring next to FIG. 2, a stream of aqueous solids in solution or dispersion lacking any natural oil enters fluidizing tank 210 through line 212. Surfactant charge and make up is delivered through line 211. Light fluidizing oil and recycled surfactant enter fluidizing tank 210 through line 214. The fluid mixture in tank 210 is agitated by means of stirring device 216 and then withdrawn from that tank by means of pump 218. Pump 218 delivers the mixture through line 220 to the evaporating region of the first stage or third effect evaporator 222 of an overall drying evaporator assembly or array. In evaporator 222 water and a portion of the light oil are boiled off at a subatmospheric pressure which may typically be about 2 to 10 inches Hg absolute. The temperature of the partially dehydrated and partially de-oiled first stage product derived from the entering mixture of surfactant and aqueous solids in light oil is in the range of about 70°–250° F. and preferably about 90°–175° F., depending on the pressure in the evaporator. The first stage is heated by mixed steam and light oil vapor from line 244 which is at a temperature about 20°–40° F. higher than the temperature of the partially dehydrated surfactant and aqueous solids in oil mixture, and which comes from the vapor chamber of the succeeding or second stage of the evaporator. Condensate of the heating vapor is withdrawn through line 226 which meets line 228 at a "T" joint or connection. The condensate is conducted through line 228 to oil-water separator 230. Mixed steam-light oil vapor formed as a result of the partial dehydration of the entering mixture of surfactant and aqueous solids in light oil is removed from the vapor chamber of evaporator 222 through line 234 into surface condenser 236 within which a partial vacuum is maintained by means of vacuum pump 238 which is connected to surface condenser 236 via vacuum line 240.

The mixture of water and light oil vapors entering surface condenser 236 through line 234 is condensed by cooling water entering the condenser through line 242 and leaving the condenser through line 244. The mixed condensate of warm water and light oil is discharged from the condenser through line 246 into oil-water separator 230.

Inside oil-water separator 230 the mixture of water and light oil is separated into light oil and partially clarified water containing some light oil. The separated light oil is removed from oil-water separator 230 through line 248 and is conducted thereby to screen bowl centrifuge 201 for washing centrifuged solids free of surfactant.

The partially clarified water is conducted from oil-water separator 230 via line 254 to coalescer 256. Inside coalescer 256 the partially clarified water containing some light oil is separated into light oil and clean product water. The separated light oil is withdrawn from coalescer 256 through line 258, which meets line 248 at a "T" point, and is ultimately conducted to screen bowl centrifuge 201. A portion of the oil from coalescer 256 is recycled to line 214 via line 259. Clean product water is withdrawn from coalescer 256 through line 260. If desired, part of the product water may be reused throughout the system. Alternatively, all the recovered water may be stored in a reservoir for later use in applications in which essentially clean water is required.

The partially dehydrated mixture of surfactant and aqueous solids in light oil from evaporator 222 is continuously removed through line 262 with the assistance of pump 264. The partially dehydrated and partially de-oiled mixture is forced through line 262 to the evaporating region of second stage 266 of the evaporator. In the second stage evaporator a procedure is followed which is similar to that in the first stage except that the pressure is higher. The pressure in each succeeding evaporator stage is somewhat higher than in the preceding stage, approaching atmospheric pressure in the last stage. The temperature of the further dehydrated and deoiled product of the second stage evaporator is in the range of about 100°–400° F. and preferably about 125°–350° F., depending on the pressure in the evaporator. The heating medium is mixed steam and light oil vapor which is at a temperature about 20°–40° F. higher than the temperature of the slurry or product material leaving the second stage evaporator. The mixed heating vapor comes through line 268 from the vapor chamber of the third or succeeding evaporator stage. Condensate of the mixed heating vapor is withdrawn from second stage evaporator 266 through line 228 and is discharged into oil-water separator 230. As mentioned above, mixed steam-light oil vapor formed as a result of the further dehydration of the partially dehydrated and deoiled mixture of surfactant and aqueous solids in light oil is removed from the vapor chamber of second stage evaporator 266 through line 224 and is used as the heating medium in first stage evaporator 222.

The further dehydrated and deoiled slurry of surfactant and aqueous solids in light oil withdrawn from second stage evaporator 266 is discharged by pump 270 through line 274, and conducted thereby to the evaporating region of third stage 276 of the evaporator. The pressure in the third stage is higher than in the second stage, advantageously being approximately atmospheric. The temperature of the product of third stage evaporator 276, i.e., a slurry of surfactant and solids in light oil containing about 0.075% by weight of water based on the entire slurry, is greater than that of second stage evaporator 266 and is within the range of about 100°–400° F. and preferably about 150°–350° F. The heating medium for third stage evaporator 276 is steam at a temperature about 30°–50° F. higher than that of the product, i.e., an essentially anhydrous slurry of surfactant and solids in light oil. That steam is generated in boiler-furnace 277 and conveyed to third stage 276 of the evaporator through line 278. Condensate of the heating steam is withdrawn through line 280 and returned to the boiler-furnace. As already mentioned mixed steam-light oil vapor formed as a result of the still further dehydration and deoiling of the slurry of surfactant and solids in light oil, the dehydration being carried practically to dryness, is removed from the vapor chamber of third stage evaporator 276 through line 268 and is used as the heating medium in second stage evaporator 266.

The essentially anhydrous slurry of surfactant and solids in light oil is withdrawn from the sump or bottom of third stage evaporator 276, and is forced by pump 282 through line 284 to screen bowl centrifuge 201 where the initial effect of simple centrifugation throws off the bulk of the surfactant and light oil from the solids. The thrown off material flows from the centrifuge through line 288 to light oil storage tank 250. Continuing through the centrifuge, the solids input thereto enters the screen bowl section thereof and is there washed by light oil returned throught line 248. That washing removes the residual surfactant from the solids, and a thrown off or spun off mixture of light oil and surfactant flows from the centrifuge through line 289 to light oil storage tank 250 so that by means of its input lines 288 and 289 that tank receives essentially all of the surfactant and almost all of the light oil, i.e., the fluidizing oil, flowing through the system. Light fluidizing oil and surfactant recovered in tank 250 are withdrawn therefrom by pump 290 in line 214 and discharged through that line to fluidizing tank 210 for recycling through the system.

The solids having residual light oil sorbed thereon exit from screen bowl centrifuge 201 and enter live bottom bin 294 via conduit 296. The live bottom of bin 294 causes the solids to advance to the exit thereof where they are conducted by gravity through conduit 298 into cake deoiler apparatus 300. Deoiler apparatus 300 may, if desired, be externally heated by steam generated in boiler-furnace 277 which enters steam jacket 302 through line 304. Condensate of the jacket steam is withdrawn through line 306 and returned to the boiler-furnace. Blowing steam generated in boiler-furnace 277 is conducted via line 304 to line 308, which is connected thereto by a "T" joint, and via line 308 into deoiler apparatus 300 wherein said steam comes into direct contact with the light oil-laden solids and causes vaporization of said light oil at a temperature below its normal boiling point. Effluent blowing steam and vaporized light oil exit from the deoiler apparatus through line 310.

The solids, free from sorbed light oil, are discharged by gravity from deoiler apparatus 300 through conduit 314 into live bottom bin 316. The screw conveyor bottom of bin 316 conducts the solids to the exit thereof where said solids, free from the fluidizing light oil as well as being in an essentially anhydrous state, are discharged through line 318 into grinder or comminutor 319. By means of grinder 319 the solids are reduced to granular if not powder form, and from the grinder they flow through line 320 to a rotary selector valve 321 by which they may be directed to either line 322 or 323. Line 322 leads to collecting or bagging equipment, and through it the solids may be withdrawn for use outside the illustrated system. Line 323, shown as active according to the setting of valve 321, leads to the suction of blower 324, and that blower discharges the comminuted solids through line 325 to the combustion region of boiler-furnace 277 where they serve as fuel.

Effluent blowing steam and vaporized light oil exiting from deoiler apparatus 300 are conducted by line 310 to second stage evaporator 266 where the mixed vapor supplies evaporative heat to said second stage evaporator. Since the second evaporator stage is operated at less than atmospheric pressure, a valve 326 equipped with a pressure sensor is located on line 310 and serves to maintain slightly less than atmospheric pressure in deoiler apparatus 300. The deoiling step is, therefore, conducted at essentially atmospheric pressure. Thus, in the embodiment shown, the energies of effluent blowing steam and the vaporized light oil are recovered constructively by supplying heat to second stage evaporator 266. Condensate of the heating steam and vaporized light oil is withdrawn from the second stage evaporator through line 228 and discharged into oil-water separator 230. While the effluent blowing steam and the vaporized light oil from deoiler apparatus 300 are depicted as supplying evaporative heat to second stage evaporator 266, it will be understood that the energy of those mixed vapors may be recovered by supplying heat to first stage evaporator 222 or, indeed, to any evaporating stage in the system except to the shellside of third stage evaporator 276 or last stage evaporator in any event. That is because the oil contained in those vapors would contaminate the condensate returned to boiler-furnace 277 through line 280, and also because the temperature of the vapors may not be sufficiently high to satisfy the heat transfer requirements. Alternatively, the effluent blowing steam and vaporized light oil associated with it may be used for preheating the surfactant and aqueous solids-light fluidizing oil mixture by injection into fluidizing tank 210 or, indeed, at any other location in the system where recovery of their energy can offer process credits and contamination is either not a problem or avoidable by proper heat transfer arrangement.

Figure 3:
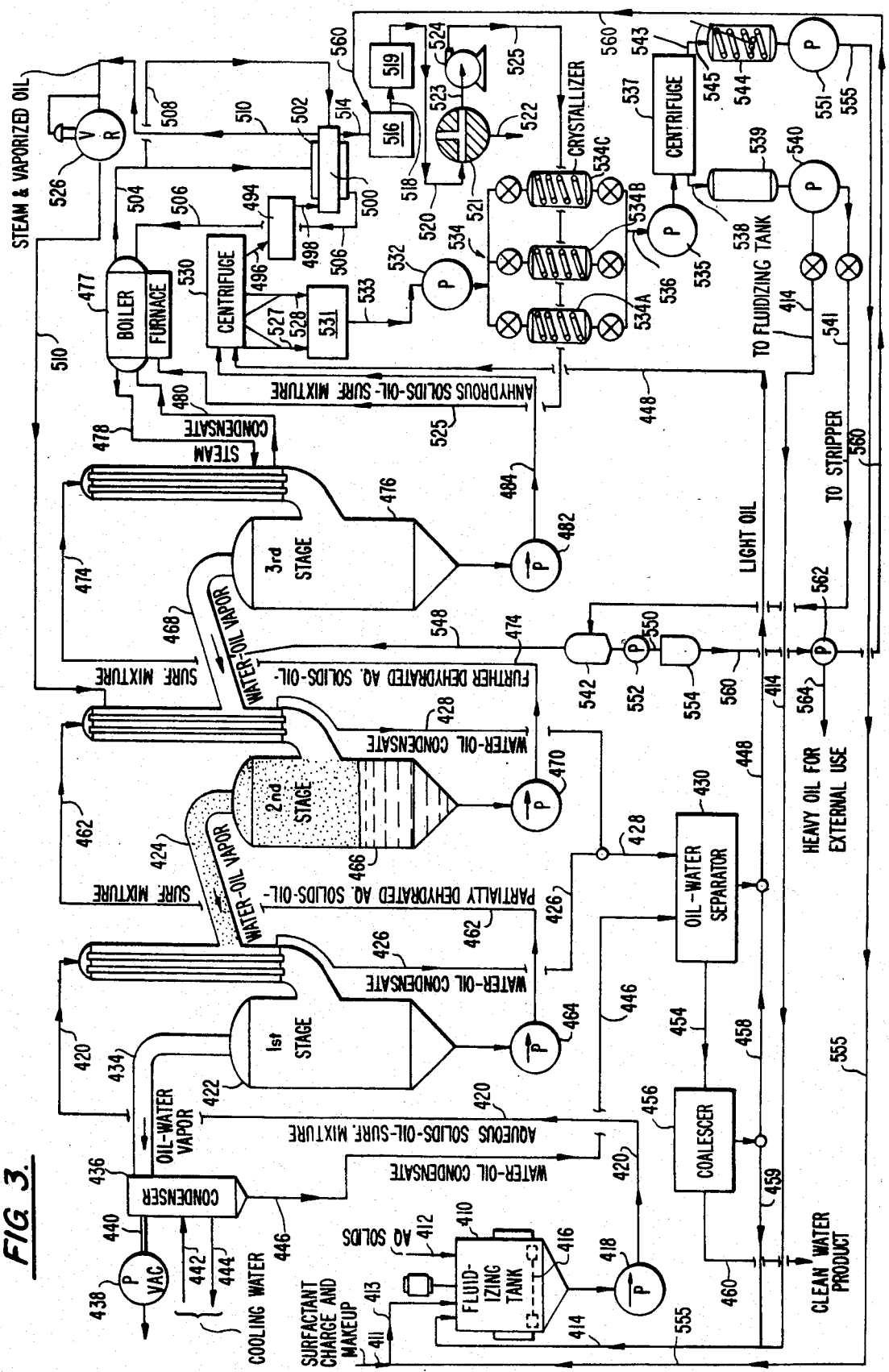
FIG. 3 is a flow diagram which illustrates an apparatus of a further embodiment of the invention wherein light oil is used as a fluidizing oil and the feed contains a natural oil, showing the separation, crystallization, and recycling of the surfactant.

Referring next to FIG. 3, a stream of aqueous solids in solution or dispersion containing a natural oil enters fluidizing tank 410 through line 412. Surfactant charge and surfactant make up enter tank 410 through lines 411 and 413, sequentially. Light fluidizing oil enters fluidizing tank 410 through line 414. The fluid mixture in tank 410 is agitated by means of stirring device 416 and then withdrawn from that tank by means of pump 418. Pump 418 delivers the mixture through line 420 to the evaporating region of the first stage or third effect evaporator 422 of an overall drying evaporator assembly or array. In evaporator 422 water and a portion of the light oil are boiled off at a subatmospheric pressure which may typically be about 2 to 10 inches Hg absolute. The temperature of the partially dehydrated and partially deoiled first stage product from the entering mixture of surfactant and aqueous solids in light oil and some natural or heavy oil is in the range of about 70°–250° F. and preferably about 90°–175° F., depending on the pressure in the evaporator. The system is heated by mixed steam and light oil vapor from line 424 which is at a temperature about 20°–40° F., higher than the temperature of the partially dehydrated and partially deoiled surfactant and aqueous solids in oil mixture and which comes from the vapor chamber of the succeeding or second stage of the evaporator. Condensate of the heating vapor is withdrawn through line 426 which meets line 428 at a "T" joint or connection. The condensate is conducted through line 428 to oil-water separator 430. Mixed steam-light oil vapor formed as a result of the partial dehydration and deoiling of the entering mixture of feed material is removed from the vapor chamber of evaporator 422 through line 434 into surface condenser 436 within which a partial vacuum is maintained by means of vacuum pump 438 which is connected to surface condenser 436 via vacuum line 440.

The mixture of water and light oil vapors entering surface condenser 436 through line 434 is condensed by cooling water entering the condenser through line 442 and leaving the condenser through line 444. The mixed condensate of warm water and light oil is discharged from the condenser through line 446 into oil-water separator 430.

Inside oil-water separator 430 the mixture of water and light oil is separated into light oil and partially clarified water containing some light oil. The separated light oil is removed from oil-water separator 430 through line 448 and is conducted thereby to screen bowl centrifuge 530 for washing centrifuge solids free of heavy oil and surfactant.

The partially clarified water is conducted from oil-water separator 430 via line 454 to coalescer 456. Inside coalescer 456 the partially clarified water containing some light oil is separated into light oil and clean product water. The separated light oil is withdrawn from coalescer 456 through line 458 which meets line 448 at a "T" joint, and is ultimately conducted to screen bowl centrifuge 530. A portion of the oil from coalescer 456 is recycled to line 414 via line 459. Clean product water is withdrawn from coalescer 456 through line 460. If desired, part of the product water may be reused throughout the system. Alternatively, all the recovered water may be stored in a reservoir for later use in applications in which essentially clean water is required.

The partially dehydrated and deoiled mixture of surfactant and aqueous solids in light oil and some heavy oil from evaporator 422 is continuously removed through line 462 with the assistance of pump 464. That mixture is forced through line 462 to the evaporating region of second stage evaporator 466 of the evaporator. In the second stage evaporator a procedure is followed which is similar to that in the first stage except that the pressure is higher. The pressure in each succeeding evaporator stage is somewhat higher than in the preceding stage, approaching atmospheric pressure in the last stage. The temperature of the further dehydrated and deoiled product of the second stage evaporator is in the range of about 100°–400° F. and preferably about 125°–350° F., depending on the pressure in the evaporator. The heating medium is mixed steam and light oil vapor which is at a temperature about 30°–40° F. higher than the temperature of the further dehydrated and deoiled slurry leaving the sump or bottom of the second stage evaporator. The mixed heating vapor comes through line 468 from the vapor chamber of the third or succeeding evaporator stage. Condensate of the mixed heating vapor is withdrawn from second stage evaporator 466 through line 428 and is discharged into oil-water separator 430. As mentioned above, mixed steam-light oil vapor formed as a result of the further dehydration and deoiling of the partially dehydrated mixture of surfactant and aqueous solids in light and heavy oil is removed from the vapor chamber of second stage evaporator 466 through line 424 and is used as the heating medium in first stage evaporator 422.

The further dehydrated and deoiled slurry withdrawn from second stage evaporator 466 is discharged by pump 470 through line 474, and conducted through that line to the evaporating region of third stage 476 of the evaporator. The pressure in the third stage is higher than in the second stage, advantageously being approximately atmospheric. The temperature of the product of third stage evaporator 476, i.e., a slurry of surfactant and solids in light and heavy oil containing about 0.075% by weight of water based on the entire slurry, is greater than that of second stage evaporator 466 and is within the range of about 100°–400° F. and preferably about 150°–350° F. The heating medium for third stage evaporator 476 is steam at a temperature about 30°–50° F. higher than that of the product, i.e., the essentially anhydrous slurry of surfactant and solids in light and heavy oil. That steam is generated in boiler-furnace 477 and conveyed to third stage 476 of the evaporator through line 478. Condensate of the heating steam is withdrawn through line 480 and returned to the boiler-furnace. As already mentioned, mixed steam-light oil vapor formed as a result of the still further dehydration and deoiling of the slurry of surfactant and solids in light and heavy oil is removed from the vapor chamber of third stage evaporator 476 through line 468 and is used as the heating medium in second stage evaporator 466.

An essentially anhydrous slurry of surfactant and solids in light and heavy oil is withdrawn from third stage evaporator 476 and is forced by pump 482 through line 484 to screen bowl centrifuge 530 where the initial effect of simple centrifugation throws off the bulk of the surfactant, light oil and natural or heavy oil from the solids. The thrown off material flows from the centrifuge through line 527 to holding tank 531. Continuing through the centrifuge, the solids input thereto enters the screen bowl section thereof and is there washed by light oil returned through line 448. That washing removes the residual surfactant and heavy oil from the solids, and a thrown off or spun off mixture of light oil, surfactant and heavy oil flows from the centrifuge through line 528 to holding tank 531 so that by means of its input lines 527 and 528 that tank receives essentially all of the surfactant and heavy oil flowing through the system as well as a substantial amount of the light oil.

The solids having residual light oil sorbed thereon exit from screen bowl centrifuge 530 and enter live bottom bin 494 via conduit 496. The live bottom of bin 494 causes the solids to advance to the exit thereof where they are conducted by gravity through conduit 498 into cake deoiler apparatus 500. Deoiler apparatus 500 may, if desired, be heated externally by steam generated in boiler-furnace 477 which enters steam jacket 502 through line 504. Condensate of the jacket steam is withdrawn through line 506 and returned to the boiler-furnace. Blowing steam generated in boiler-furnace 477 is conducted via line 504 to line 508 which is connected thereto by a "T" joint, and via line 508 into deoiler apparatus 500 where that steam comes into direct contact with the light oil-laden solids and causes vaporization of that light oil at a temperature below its normal boiling point. Effluent blowing steam and vaporized light oil exit from the deoiler apparatus through line 510.

The solids, free from sorbed light oil, are discharged by gravity from deoiler apparatus 500 through conduit 514 into live bottom bin 516. The screw conveyor bottom of bin 516 conducts the solids to the exit thereof where those solids, free from the light fluidizing oil as well as being in an essentially anhydrous state, are discharged through line 518 into grinder or comminutor 519. By means of grinder 519 the solids are reduced to granular if not powder form, and from the grinder they flow through line 520 to a rotary selector valve 521 by which they may be directed to either line 522 or line 523. Line 522 leads to collecting or bagging equipment, and through it the solids may be withdrawn for use outside the system illustrated. Line 523, shown as active according to the setting of valve 521, leads to the suction of blower 524, and that blower discharges the comminuted solids through line 525 to the combustion region of boiler-furnace 477 where the solids serve as fuel.

Effluent blowing steam and vaporized light oil exiting from deoiler apparatus 500 are conducted by line 510 to second stage evaporator 466 where the mixed vapor supplies evaporative heat to that evaporator.

Since the second evaporator stage is operated at less than atmospheric pressure, a valve 526 equipped with a pressure sensor is located on line 510 and serves to maintain slightly less than atmospheric pressure in deoiler apparatus 500. Although shown specifically as being conducted to the shellside of the heating region of second stage evaporator 466 for energy recovery purposes, it is to be understood that effluent blowing steam and vaporized light oil from deoiler apparatus 500 may be employed elsewhere in the system to achieve process credits, in keeping with the explanation of use of corresponding mixed vapor from deoiler apparatus 300 in FIG. 2.

Pump 532 in line 533 withdraws mixed surfactant, heavy oil and light oil from tank 531, and delivers that material to an array of a crystallizer generally designated 534 comprising individually valved tanks 534A, 534B and 534C arranged in parallel and provided with indirect cooling means. Those tanks operate repetitively through a coordinated set of batch operations similar to the ones conducted in and by tanks 104A, 104B and 104C of crystallizer 104 of FIG. 1 to provide, in the instance of crystallizer 534, a substantially continuous output of mixed heavy oil, light oil and crystallized surfactant.

A stream of the mixture just described is withdrawn from crystallizer 534 by pump 535 in line 536, and is delivered to centrifuge 537 within and by which the crystallized surfactant is separated from the heavy oil and light oil. The heavy oil and light oil mixture, essentially free of surfactant, leaves centrifuge 537 through line 538 and flows to holding tank 539 from which it is drawn off by pump 540. That pump is provided with separate discharge lines 414 and 541, each equipped with a stop valve so that the lines may be used selectively. Line 414 goes to fluidizing tank 410, and thus returns natural or heavy oil and light fluidizing oil directly to that tank. That line, line 414, is used when no heavy oil is to be withdrawn from the system as a discrete product, but rather all heavy oil entering the system as feed material in association with aqueous solids is desired to leave the system in association with dry solids product.

Line 541 goes to stripping evaporator 542, and is conveniently used when at least some of the natural or heavy oil entering the system in association with aqueous solids feed is desired to be withdrawn as a discrete product. The concerned mixture of light oil and heavy oil flowing through line 541 in the situation just postulated constitutes feed material for the heating region of evaporator 542. Steam from boiler-furnace 477 may be injected into line 541 for preheating that feed material, especially according to the showing in FIG. 3 of U.S. Pat. No. 4,270,974 cited hereinbefore. The heating or actuating fluid for the stripping evaporator may be steam from the boiler-furnace with its condensate returning thereto, also as shown in the patent figure just cited.

The light oil component of the feed to the stripping evaporator is vaporized therein. Light oil vapor mixed with steam injected into line 541 is conducted from the vapor chamber of evaporator 542 via vapor duct or line 548 which connects into line 468. As discussed above, line 468 conducts a mixed steamlight oil vapor from third stage evaporator 476 to second stage evaporator 466 to supply evaporative heat thereto. The mixed light oil and water vapors in line 548 flowing into line 468 thus combine with the vapors therein from the third stage evaporator as the source of heat for the second stage evaporator.

The heavy oil component of the feed to stripping evaporator 542 which is not vaporized therein is withdrawn from that evaporator through line 550 by pump 552 and discharged to storage tank 554. Line 560 extends from tank 554 to live bottom bin 516, and is provided with pump 562 having a ratio valve discharge means whereby the output of the pump may be divided between line 560 and line 564. Either line may receive the full output of the pump with the other receiving none as extreme conditions with any intermediate ratio of flows of heavy oil into the two lines being possible. When all heavy oil in the feed material is desired as a discrete product outside the system illustrated, the entire output of pump 562 will be directed through line 564. When it is desired, on the other hand, that the anhydrous solids product of the system have a determinate amount of heavy oil associated with it, at least some of the output of pump 562 will be directed through line 560 for blending with the dry solids in live bottom bin 516 by action of the screw conveyor bottom thereof.

When it is desired that all heavy oil entering the system leave in association with the dry solids product, direction of the output of pump 540 through line 414 rather than line 541 is preferable, and one or the other line might be dispensed with if design operating conditions of an unchanging nature be established in advance. The use of line 541, stripping evaporator 542 and pump 562 with a ratio valve discharge, however, provides added flexibility to the system.

The crystallized surfactant output from centrifuge 537 leaves through line 543 and flows to remelt tank 544 equipped with heating means and an agitator 545 to accelerate the melting process. From tank 544 the essentially oil-free surfactant is withdrawn by pump 551 and discharged through recycle or addback line 555 which joins line 411 for return of the surfactant to fluidizing tank 410.

In accordance with the present invention certain aqueous solids have been dried using one or another of the above-described apparatuses and processes depending on the fluidizing oil used. The results showed increases in evaporation rates because of the use of surfactants and that is illustrated by the following examples:

EXAMPLE II

The residue from corn fermentation (corn stillage) after the removal of the alcohol fraction was to be dried in a vegetable oil. The evaporation rate of the vegetable oil-corn sillage mixture, when processed without the addition of a surfactant of dispersant, was 12.6 lbs. water/hr. After the addition of surfactant, the evaporation rate was 34.0 lbs. water/hr. or 170% higher. A polyglycerol of oleic acid in an amount of 0.45% by weight of the drying or fluidizing oil was used as the surfactant in this example.

EXAMPLE III

A chemical waste stream, when dried without a surfactant, showed an evaporation rate of 7.2 lbs. water/hr. After adding 0.3% by fluidizing oil weight of a surfactant, Tween-61, the rate rose to 27.0 lbs. water/hr., a 275% increase. The fluidizing oil was a light oil Isopar L, a product of Humble Oil and Refining Co.

EXAMPLE IV

The evaporation rate of a chocolate waste stream, when dried without a surfactant, was 16 lbs. water/hr. After adding a surfactant, the rate rose to 21 lbs water/hr., a 31.25% increase. In this example, the drying oil used was fuel oil No. 6, a heavy oil, and the surfactant was a polyglycerol of oleic acid in an amount of 0.5% by fluidizing oil weight.

EXAMPLE V

Beet pulp residue, when dried without a surfactant, showed an evaporation rate of 12 lbs. water/hr. When a surfactant was added, that rate rose to 30 lbs. water/hr., a 150% increase. The fluidizing oil was a light oil and the surfactant was a polyglycerol of oleic acid in an amount of 0.25% by fluidizing oil weight.

Further in accordance with the present invention materials have been dried in the case of which maintanence of continuous fluid systems with solids particles substantially uniformly suspended and distributed throughout the fluidizing or drying medium would have been difficult without the use of surfactants. That is illustrated by the following example:

EXAMPLE VI

Liquid whey at 40% concentration of non-fat solids is very difficult to dry in an oil system because the particles tend to soften and coalesce at moderate temperatures and also fall out of the circulating oil. The addition of a surfactant maintained the form of the developed soft particles through the drying operation. In this example, the fluidizing oil was soybean oil and the surfactant was a polyglycerol of oleic acid in an amount of 0.5% by fluidizing oil weight.

The pumping rate is adversely affected when water wetted solids are not properly dispersed in the oil phase. The pump amperage rises, and overheating and failure of the pump may occur along with deposition of solids into the pump and pump suction line causing a shutdown of the plant.

It has been shown that along with increased evaporation efficiency, i.e., evaporation rate increases, when using surfactants, there is a decrease in the boiling point rise (B.P.R.) during the evaporation process. Such effect or action reduces the energy or steam requirement to dehydrate a wet material. Examples of B.P.R. decrease are the following:

EXAMPLE VII

In the dehydration of sugar beet pulp when there was no surfactant used the boiling point rise was 1st stage 14°–19° F.; 2nd stage 19°–20° F.; 3rd stage 30°–32° F. With the use of 0.25% surfactant by fluidizing oil weight, the rise was reduced to 1st stage 9°–10° F.; 2nd stage 14°–15° F.; 3rd stage 16°–17° F. In this example the fluidizing oil was a light oil Isopar H may by Humble Oil and Refining Co., and the surfactant was a polyglycerol of oleic acid.

EXAMPLE VIII

During the dehydration of a chemical waste stream performed as a single stage operation in Isopar H as the fluidizing oil, the use of 0.125% surfactant Sulfur 5000 by fluidizing oil weight reduced the B.P.R. from 14° F. to 8° F.

Figure 4:
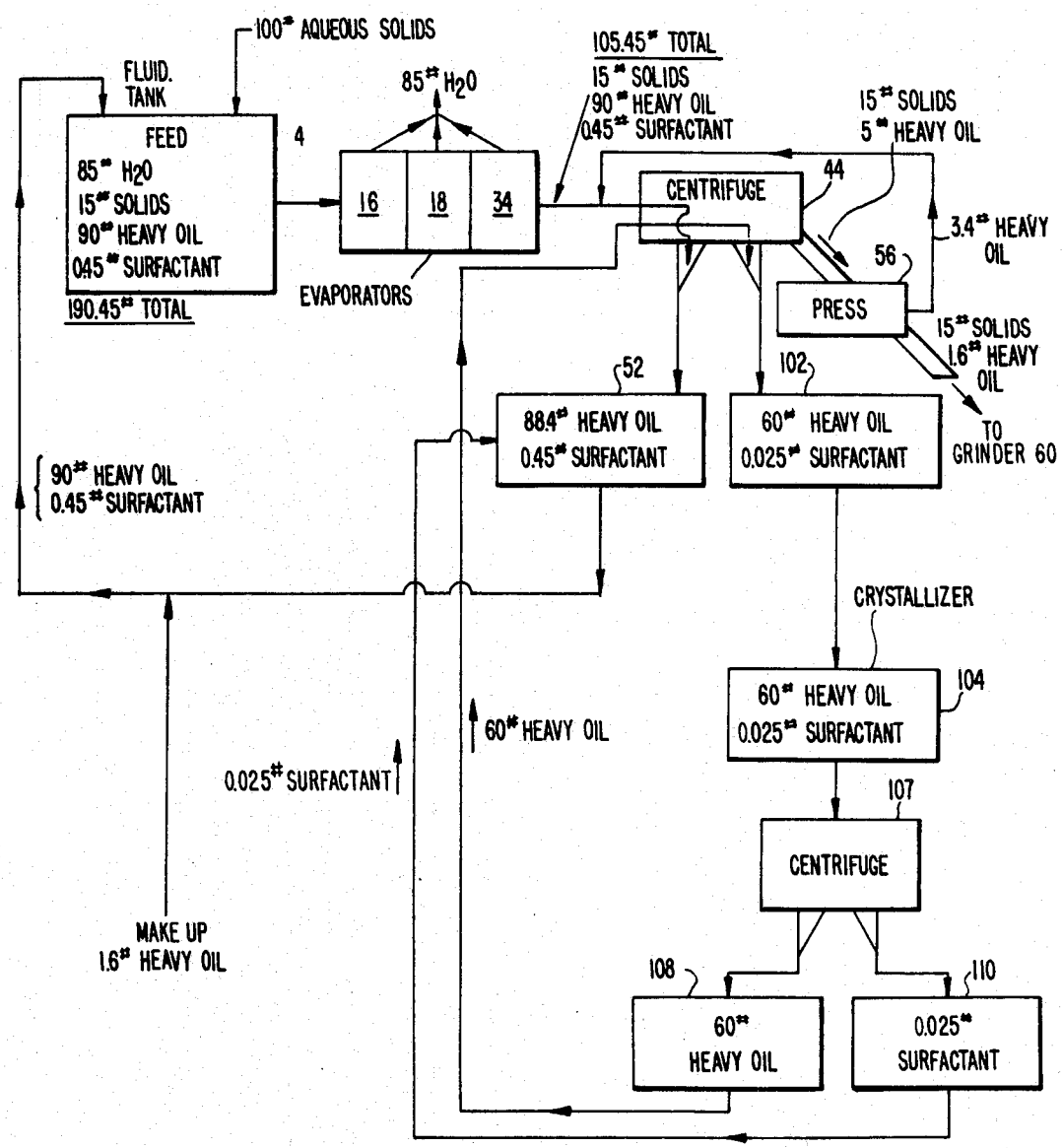

Referring next to FIG. 4, a schematic derived from FIG. 1, there is provided an oil-solid-surfactant material balance for a specific example illustrating the present invention. In that example employing a heavy fluidizing oil there are charged to the first stage evaporator 16, from fluidizing tank 4, 190.45 lbs. of feed consisting of 100 lbs. of aqueous solids including 15 lbs. oil-free solids and 85 lbs. water, 90 lbs. heavy oil, and 0.45 lb. surfactant, and according to it:

The dry slurry charge to screen bowl centrifuge 44 after evaporation of the 85 lbs. of water is a mixture containing 90 lbs. heavy oil, 15 lbs. dry solids and 0.45 lb. surfactant;

The first fluid effluent from screen bowl centrifuge 44 goes to tank 52 and is 85.0 lbs. heavy oil accompanied by 0.425 lb. surfactant. 3.4 lbs. heavy oil processed from press 56 also flow to tank 52;

The second fluid effluent from screen bowl centrifuge 44 goes to tank 102 and consists of 60 lbs. heavy oil/wash oil and 0.025 lb. surfactant, and that all flows to crystallizer 104;

The solids discharge from screen bowl centrifuge 44 to press 56 consists of 15 lbs. solids accompanied by 5 lbs. heavy oil;

The discharges from press 56 consist of (1) 16.6 lbs. solids product having 10% heavy oil, i.e., 15 lbs. solids and 1.6 lbs. heavy oil, to grinder 60 (not shown), and (2) 3.4 lbs. expressed oil to centrifuge 44 and then to tank 52;

The discharge from crystallizer 104 to centrifuge 107 consists of 60 lbs. heavy oil accompanied by 0.025 lb. crystallized surfactant;

The discharges from centrifuge 107 consist of (1) 60 lbs. heavy oil to tank 108 for subsequent use as wash oil, and (2) 0.025 lb. surfactant to tank 110 and then to tank 52 to be recycled to fluidizing tank 4 along with heavy oil and other surfactant; and Make up heavy oil to fluidizing tank 4 consists of 1.6 lbs. heavy oil corresponding to that lost on pressed solids from press 56.

Figure 5:
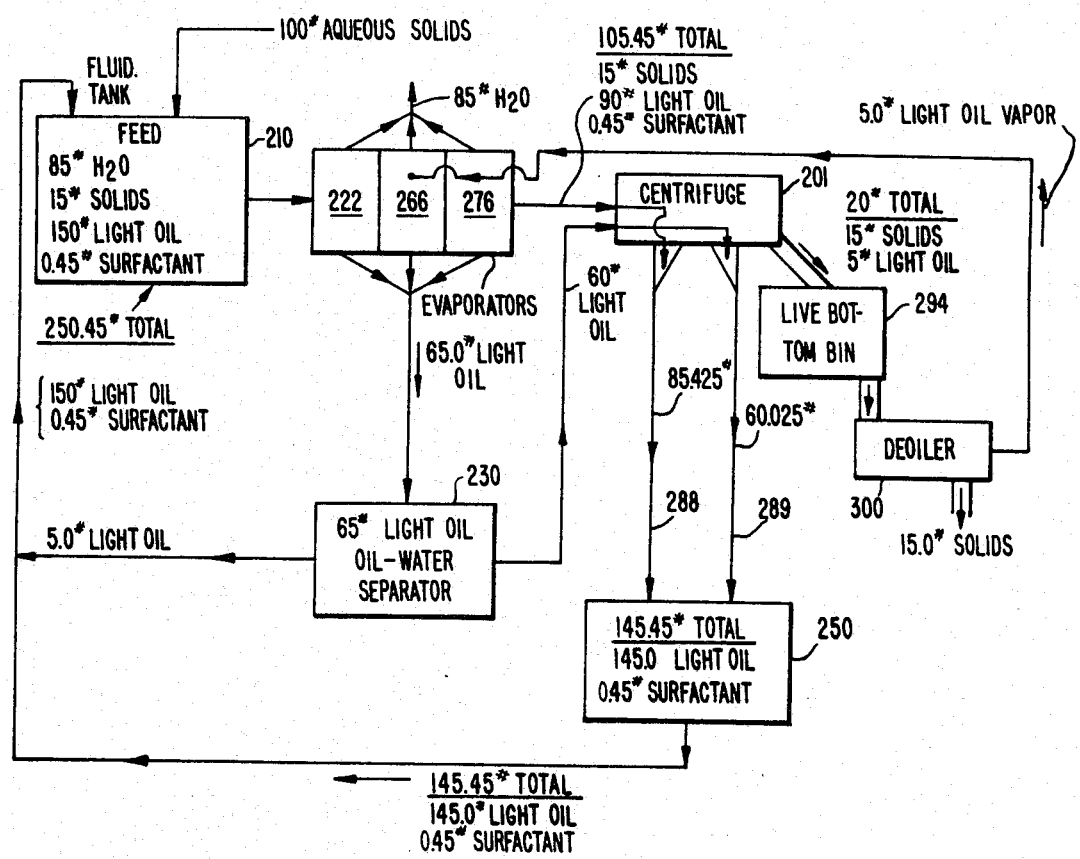

Referring next to FIG. 5, a schematic derived from FIG. 2, there is provided an oil-solids-surfactant material balance for another specific example illustrating the present invention. In that example using a light fluidizing oil with feed containing no natural oil there are charged to first stage evaporator 222, from fluidizing tank 210, 250.45 lbs. of feed consisting of 100 lbs. of aqueous solids including 15 lbs. oil-free solids and 85 lbs. water, 150 lbs. light oil and 0.45 lb. surfactant, and according to it:

The dry slurry out of evaporator 276, after evaporation of 85 lbs. water, charged to screen bowl centrifuge 201 is a mixture containing 90 lbs. light oil, 15 lbs. dry solids and 0.45 lb. surfactant;

The first fluid effluent from screen bowl centrifuge 201 goes to tank 250 and is a mixture of 85 lbs. light oil and 0.425 lb. surfactant;

The second fluid effluent from screen bowl centrifuge 201 goes to tank 250 and consists of 0.025 lb. surfactant and 60 lbs. light oil used for washing and obtained from oil-water separator 230, representing most of the 65 lbs. light oil input to that separator. The remaining 5 lbs. of that input flows back to the fluidizing tank. For simplicity of illustration, oil-water separator 230 is taken to include the function of coalescer 256;

The solids discharge from screen bowl centrifuge 201 to live bottom bin 294 and then to deoiler 300 comprises 15 lbs. solids accmpanied by 5 lbs. light oil;

The discharges from deoiler 300 consist of (1) 15 lbs. solids leaving the system as product, and (2) 5 lbs. light oil vapor flowing to evaporator 266; and The discharge from tank 250 receiving first and second fluid effluents from screen bowl centrifuge 201, 145 lbs. light oil and 0.45 lb. surfactant in the aggregate, is all returned to fluidizing tank 210.

Referring finally to FIG. 6, a schematic derived from FIG. 3, there is provided an oil-solids-surfactant material balance for a further specific example illustrating the present invention. In that example using a light fluidizing oil and feed containing a natural oil there are charged to the first stage evaporator 422, from fluidizing tank 410, 190.45 lbs. of feed consisting of 100 lbs. of aqueous solids including 15 lbs. oil-free solids, 83.5 lbs. water and 1.5 lbs. natural oil, 90 lbs. light oil and 0.45 lb. surfactant, and according to it:

The dry slurry charge out of evaporator 476, after evaporation of 83.5 lbs. water, to screen bowl centrifuge 530 is a mixture containing 15 lbs. solids, 1.5 lbs. natural oil, 90 lbs. light oil and 0.45 lb surfactant;

The first fluid effluent from screen bowl centrifuge 530 to tank 531 through line 527 contains 85 lbs. light oil, 0.425 lb. surfactant and 1.416 lbs. natural oil;

The second fluid effluent from screen bowl centrifuge 530 to tank 531 through line 528 contains 60 lbs. light oil, 0.025 lb. surfactant and 0.084 lb. natural oil;

The solids discharge from screen bowl centrifuge 530 to bin 494 and then to deoiler 500 comprises 15 lbs. solids accompanied by 5 lbs. light oil;

The discharge from deoiler 500 consist of (1) 15 lbs. solids going toward product, and (2) 5 lbs. light oil as vapor to second stage evaporator 466 for heat recovery;

The charge to live bottom bin blender 516 from deoiler 500 is 15 lbs. dry solids to which 1.5 lbs. natural oil are blended for the product material;

Tank 531 receiving first and second fluid effluents from screen bowl centrifuge 530, 145 lbs. light oil, 0.45 lb. surfactant and 1.5 lbs. natural oil in the aggregate, discharges to crystallizer 534 where 0.45 lb. surfactant is crystallized;

The oil mixture with crystalline content (total weight 145.950 lbs.) is charged to centrifuge 537 where the solid surfactant (0.45 lb.) is separated and charged to tank, 544, melted therein and then recycled to fluidizing tank 410. The separated liquid oil (146.5 lbs.) is charged to tank 539;

The oil charge in tank 539 is pumped to stripping evaporator or stripper 542 where 145 lbs. of light fraction are vaporized and directed to second stage evaporator 466 for heat recovery and condensation. The resulting condensate flows to oil-water separator 430 along with 5 lbs. of condensate obtained from the light oil vapor effluent of deoiler 500;

The oil-water separator having received a total of 150 lbs. of light oil, transfers 90 lbs. to fluidizing tank 410 and 60 lbs. to screen bowl centrifuge 530 to be used for washing the centrifuge solids. For simplicity of illustration, oil-water separator 430 is taken to include the function of coalescer 456, and The 1.5 lbs. natural oil recovered in stripper 542 are pumped to live bottom blender 516 where that oil is mixed with the solids by blending or spraying for the system product.

Thus, the instant invention provides a process and apparatus for continuously dehydrating aqueous solids by use of a fluidizing oil and a surfactant. While specific embodiments of the present invention have been shown and described in detail to illustrate the utilization of the inventive principles, it is to be understood that such showings and descriptions have been offered only by way of example and not by way of limitation. Protection by Letters Patent of this invention in all its aspects as the same are set forth in the appended claims is sought to the broadest extent that the prior art allows.

I claim as my invention:

1. An apparatus for continuously dehydrating aqueous solids, said apparatus comprising:
   (1) a fluidizing tank disposed to receive a stream of aqueous solids and provided with a stirring or mixing mechanism;
   (2) a fluidizing oil source;
   (3) a surfactant source;
   (4) means for transmitting fluidizing oil from said fluidizing oil source to said fluidizing tank;
   (5) means for transmitting surfactant from said surfactant source to said fluidizing tank wherein fluidizing oil, aqueous solids and surfactant may be mixed;
   (6) an evaporator disposed to heat and dehydrate continuously a feed mixture of aqueous solids, fluidizing oil and surfactant and discharge water driven off therefrom as vapor;
   (7) a conduit extending from said fluidizing tank to said evaporator through which a mixture of aqueous solids, surfactant and fluidizing oil may flow from said tank into the evaporating region of said evaporator;
   (8) a screen bowl centrifuge disposed to wash and separate anhydrous solids from a mixture of substantially anhydrous solids, fluidizing oil and surfactant;
   (9) a conduit extending from said evaporator to said screen bowl centrifuge through which may flow a mixture of substantially anhydrous solids, fluidizing oil and surfactant from said evaporator to said centrifuge;
   (10) means for withdrawing anhydrous solids substantially free of fluidizing oil and surfactant from said centrifuge, and
   (11) means for withdrawing fluidizing oil and surfactant from said centrifuge and recycling the same to said fluidizing tank for mixing therein with new aqueous solids, that means comprising
      (i) a crystallizer for treating fluidizing oil and surfactant withdrawn together from said screen bowl centrifuge;
      (ii) means for conveying fluidizing oil and surfactant to said crystallizer from said screen bowl centrifuge;
      (iii) a centrifuge other than said screen bowl centrifuge disposed to separate crystallized surfactant from fluidizing oil;
      (iv) means for conveying a mixture of fluidizing oil and crystallized surfactant from said crystallizer to said other centrifuge;
      (v) means for recycling fluidizing oil withdrawn from said other centrifuge to said fluidizing tank for mixing therein with new aqueous solids;
      (vi) a remelt tank for melting the crystallized surfactant withdrawn from said other centrifuge;
      (vii) means for conveying crystallized surfactant from said other centrifuge to said remelt tank, and
      (viii) means for conveying surfactant from said remelt tank to said fluidizing tank for mixing therein with new aqueous solids.

2. The apparatus of claim 1 wherein said evaporator is a multi-stage evaporator.

* * * * *

UNITED STATES PATENT AND TRADEMARK OFFICE
CERTIFICATE OF CORRECTION

PATENT NO. : 4,662,990

DATED : May 5, 1987

INVENTOR(S) : Anthony J. Bonanno

It is certified that error appears in the above-identified patent and that said Letters Patent is hereby corrected as shown below:

Col. 1, line 68: "of" should read --or--.

Col. 4, line 4: "frree" should read --free--.

Col. 6, line 9: "bubble" should read --bubbles--.

Col. 6, line 23: "applied" should read --supplied--.

Col. 6, line 58: "From" should read --from--.

Col. 7, line 55, insert a comma between "filling" and tank".

Col. 7, line 55, cancel the comma between "tank" and "104B".

Col. 8, line 57: cancel "should".

UNITED STATES PATENT AND TRADEMARK OFFICE
CERTIFICATE OF CORRECTION

PATENT NO. : 4,662,990

DATED : May 5, 1987

INVENTOR(S) : Anthony J. Bonanno

It is certified that error appears in the above-identified patent and that said Letters Patent is hereby corrected as shown below:

Col. 11, line 5: "throught" should read --through--".

Col. 15, line 64: "steamlight" should read --steam-light--".

Col. 16, line 54: "sillage" should read --stillage--".

Col. 17, line 19: "case" should read --cases--.

Col. 17, line 43: "increases" should read --increase--.

Col. 17, line 57: "may" should read --made--.

Col. 19, line 26, there should be a space between "and" and "0.084".

UNITED STATES PATENT AND TRADEMARK OFFICE
CERTIFICATE OF CORRECTION

PATENT NO. : 4,662,990

DATED : May 5, 1987

INVENTOR(S) : Anthony J. Bonanno

It is certified that error appears in the above-identified patent and that said Letters Patent is hereby corrected as shown below:

Col. 19, line 30,

"discharge" should read --discharges--.

Col. 19, line 44, cancel the comma between "tank" and "544".

Signed and Sealed this

Eighteenth Day of August, 1987

*Attest:*

DONALD J. QUIGG

*Attesting Officer*      *Commissioner of Patents and Trademarks*